(12) United States Patent
Tsai et al.

(10) Patent No.: US 6,381,043 B1
(45) Date of Patent: Apr. 30, 2002

(54) DEVICE USED IN IMAGE SCANNER FOR QUICKLY AND PRECISELY DETERMINING SCAN START POINT AND IMPROVING SCANNING QUALITY

(75) Inventors: Jenn-Tsair Tsai, Taipei Hsien; Bill Chen, Pingtung, both of (TW)

(73) Assignee: Mustek Systems Inc., Taiwan ( * ) Notice: Subject to any disclaimer, the term of this patent is extended or adjusted under 35 U.S.C. 154(b) by 0 days.

(21) Appl. No.: 09/275,507

(22) Filed: Mar. 24, 1999

Related U.S. Application Data

(63) Continuation-in-part of application No. 09/152,152, filed on Sep. 11, 1998, now Pat. No. 6,229,629.

(30) Foreign Application Priority Data

May 20, 1998 (TW) .......................................... 98/861132

(51) Int. Cl.⁷ ................................................. H04N 1/04
(52) U.S. Cl. ........................ 358/488; 358/486; 358/497
(58) Field of Search ................................ 358/488, 486, 358/497, 474, 494, 482, 483, 487, 505, 506, 504, 406; 399/75, 380; 250/559.29, 208.1, 234–236

(56) References Cited

U.S. PATENT DOCUMENTS

| | | | | |
|---|---|---|---|---|
| 4,933,778 A | * | 6/1990 | Tufano et al. ............... | 358/488 |
| 5,033,102 A | * | 7/1991 | Nakajama et al. .......... | 382/282 |
| 5,144,455 A |   | 9/1992 | Stein et al. ................. | 358/443 |
| 5,198,907 A | * | 3/1993 | Walker et al. ............... | 358/296 |
| 5,719,404 A | * | 2/1998 | Tsai ....................... | 250/559.29 |
| 6,061,147 A | * | 5/2000 | Lee ............................ | 358/488 |
| 6,229,629 B1 | * | 5/2001 | Tsai ............................ | 358/486 |
| 6,144,467 A1 | * | 11/2001 | Tsai ............................ | 358/486 |

\* cited by examiner

*Primary Examiner*—Cheukfan Lee
(74) *Attorney, Agent, or Firm*—Skjerven Morrill MacPherson LLP

(57) ABSTRACT

A device for quickly and precisely determining a scan start point and improving scanning quality for an image scanner is disclosed. The image scanner includes a photo-processing device and a scanning platform for placing thereon a document to be scanned. The scanning platform is printed with a background region and two color blocks. The two color blocks are separately enclosed by the background region and are of different color from the color of the background region. The first color block has a first specified point therein being a predetermined shift to the scan start point along a specific direction. The second block has a second specified point corresponding to the first specified point in position. The photo-processing device moves a predetermined distance L0 from the home position to a pre-scan position overlapping with the two color blocks by four reference points, read the coordinates of the four reference points, then moves a calculated distance L1 from the pre-scan position to the first specified point, and moves another predetermined distance L2 from the specified point to the scan start point along the specific direction to start scanning. The distance L1 can be automatically adjusted to cover the installation error of the photo-processing device. According to the coordinates of the four reference points, the coordinates of the two specified points can be calculated, thereby realizing a deflection rate and/or an amplification error of a scanning result. For another image scanner disclosed herein, the movement of the distance L0 can be omitted by having the color blocks located at the home position which serves as the pre-scan position.

25 Claims, 7 Drawing Sheets

DEVICE USED IN IMAGE SCANNER FOR QUICKLY AND PRECISELY DETERMINING SCAN START POINT AND IMPROVING SCANNING QUALITY

The present invention is a continuation-in-part application of the parent application bearing Ser. No. 09/152,152 and filed on Sep. 11, 1998, U.S. Pat. No 6,229,629. The present invention is related to an image scanner, and more particularly to an image scanner which includes means for determining a scan start point quickly and precisely.

FIELD OF THE INVENTION

Background of the Invention

Nowadays, an image scanner has gradually become a standard peripheral equipment of a personal computer. Therefore, scanner manufacturers have been trying their best to improve the scanning quality, for example, to compensate brightness, chrominance, etc., and/or correct scanning line errors. On the other hand, high scanning speed is also a criterion of an exquisite image scanner.

In order to enhance the scanning speed of an image scanner, several devices and methods have been proposed in prior art. For example, please refer to FIG. 1 which schematically shows home-sensor means for speeding up the movement of an image pickup module 11 from a standby line N to a scan start line M, i.e. a document reference line. In this case, it is assumed that the image pickup module 11 reaches the scan start line M after moving a distance D from the standby line N along the arrow direction. In other words, the image pickup module 11 directly moves a pre-determined distance, rather than moves pixel by pixel to detect the presence of a document, and then starts scanning. Therefore, the movement of the image pickup module 11 from the standby line N to the scan start line M is fast.

However, there likely to be defects resulting from errors of various parts and/or assembling inaccuracy in this home sensor means. For example, if the image pickup module 11 is inaccurately installed at a position lower than a predetermined one while assembling, i.e. the standby line is lowered, the actual scan start line M1 will be accordingly lower than the document reference line M after the same distance D of movement, referring to the dotted lines and the dotted arrow in FIG. 1. Therefore, the top portion 13 of the document 12 will be missed out in the scanning operation.

Another conventional means is proposed to avoid the missing of document data. Please refer to FIG. 2 which schematically shows means for precisely determining a scan start point in an image scanner. On the scanning platform of this image scanner, a black region 21 is provided in front of a scan start line R where a front edge of a document 22 to be scanned is positioned. In this case, the image pickup module (not shown) quickly moves toward the black region 21, and then slowly passes through the black region 21 after reaches the black region 21 to detect the disappearance of the black color. When the detected black color disappears, the image pickup module keeps on moving and begins to measure a distance Q along the arrow direction. It is assumed that the scan start line R is reached after the image pickup module moves the distance Q from the reference point P. By this way, the downshift error resulting from the downshift installation of the image pickup module, as shown in FIG. 1, can be avoided because the predetermined distance Q is measured from the lower edge of the black region, i.e. the reference point P, rather than from the standby line of the image pickup module. Nevertheless, there still exists a defect in this means. Generally, when the image pickup module reaches the scan start line R, the nth pixel unit of a CCD of the image pickup module is predetermined to serve as the start point of the same scanning line, and the nth pixel unit and the pixel units thereafter are used to simultaneously pick up the image of the document line by line. If the image pickup module slightly deflects from its pre-determined path owing to an assembling defect, the same distance Q of movement will make the image pickup module reach another deflective line rather than the pre-determined scan start line R so that the nth pixel unit of the CCD will be a little shifted, and the scanning of a left portion of the document might be missed out. In addition, the scanning lines will slant.

In the parent application bearing Ser. No. 09/152,152 and filed on Sep. 11, 1998, means for determining a scan start point quickly and precisely, and simultaneously realizing a deflection rate and/or an amplification error of the scan lines so as to enhance the overall scanning speed and improve the scanning quality of an image scanner is disclosed. Referring to FIG. 3 which schematically show the operation of a preferred embodiment of the parent application, the above purpose can be achieved by providing on the platform 30 of the image scanner two pattern marks 322 and 323 between the home position H and the scan start S. The geometric shape of the pattern marks 322 and 323 are so specific that the coordinate of each of the points constituting the pattern marks can be calculated under certain known conditions. For example, it can be designed that the linking the points A, C and D constitutes an isosceles and right-angled triangle, i.e. $\angle CAD=45°$, $\angle ADC=45°$ and $\angle ACD=90°$, and the linking of the points B, E and F constitutes another isosceles and right-angled triangle, i.e. $\angle EBF=45°$, $\angle BFE=45°$ and $\angle BEF=90°$, so that the coordinate of each of the points constituting the pattern marks 322 and 323 can be calculated under certain known conditions through triangular functions.

When a scanning operation starts, the CCD 311 of the image scanner moves a pre-determined distance L0 from the home position H quickly to reach a pre-scan position I, and reads coordinates of four reference points J, K, U and V of the pattern marks 322 and 323 at the pre-scan position I. According to the coordinates of the two reference points J and K, a further moving distance L1 of the CCD 311 from the pre-scan position I to respective ultimate point A of the pattern mark 322 can be easily determined through a mathematical function, so the movement of the CCD in this stage can also be fast. Afterwards, the CCD 311 further quickly moves another pre-determined distance L2 from the ultimate point A to the scan start S, and then starts scanning. Accordingly, the scanning speed would be satisfactory. Furthermore, it can be understood that the distance L1 can be automatically adjusted to reach the same ultimate point A no matter if the CCD 311 starts moving accurately from the home position. Therefore, the determination of the scan start point would be relatively precise.

On the other hand, according to the coordinates of the reference points J and K, the coordinate of the point A can be calculated, and according to the coordinates of the reference points U and V, the coordinate of the point B can also be realized. Further, according to the coordinates of the points A and B, the deflection rate of the scan line can be calculated. Moreover, according to the coordinates of the points A and B and the measured distance L3 between the points A and B, the amplification error of the scan line can also be realized. The deflection rate and the amplification error can be used to correct the scanning result so as to obtain a better scanning quality.

Although the image scanner of the parent application has been significantly improved in the precision and the speed of the determination of the scan start point and the scanning quality of the scan lines, the above means may suffer from the contamination spots on the platform. Generally, with reference to FIG. 3, the pattern marks 322 and 323 are printed on a white background region 324 with standard black. If the region 324 is contaminated and has spot(s) thereon, especially at the pre-scan position I, during the manufacturing process of the image scanner or after the scanner has been used for a period of time, the CCD 311 may erroneously reads the coordinates of the contamination spots instead of the reference points J, K, U and V so that an error in the determination of the distance L1 and the coordinates of the points A and B in relation to the read coordinates may occur.

On the other hand, although the scanning speed of the image scanner of the parent application is satisfactory, there is still a demand for higher scanning speed.

SUMMARY OF THE INVENTION

Therefore, an object of the present invention is to provide for an image scanner a device for quickly and precisely determining a scan start point and improving the scanning quality, in which the error resulting from the misreading of the coordinates of the contamination spots can be avoided.

Another object of the present invention is to provide for an image scanner a device for quickly and precisely determining a scan start point and improving the scanning quality, in which the movement of the distance L0 from the home position to the pre-scan position as described above can be omitted so as to further enhance the overall scanning speed of the image scanner.

According to a first aspect of the present invention, an image scanner includes a photo-signal processing device moving along a specific direction from a home position for picking up an image of a scanned document, and converting the image into digital data to be further processed; and a scanning platform for placing thereon the document. The scanning platform has thereon a first color block of a first color, a second color block of a second color, and a background region of a third color different from both of the first and the second colors. The first and the second color blocks are separated from each other, both located within the background region in front of the scan start point along the specific direction, and respectively have a first and a second interfaces with the background region. Coordinates of a first reference point and a second reference point located in the first interface, and coordinates of a third reference point and a fourth reference point located in the second interface are read when the photo-signal processing device moves to a pre-scan position and performs a pre-scan operation. The coordinates of the first and the second reference points correlate with a shift from the pre-scan position to a first specified point of the first color block along the specific direction through a first correlating mathematical function, the coordinates of the first and the second reference points correlate with a coordinate of the first specified point through a second correlating mathematical function, and the coordinates of the third and the fourth reference points correlate with a coordinate of a second specified point of the second color block, which corresponds to the first specified point in position, through a third correlating mathematical function. According to the present invention, a scan start point of the photo-signal processing device for picking up the image of the scanned document is determined according to the shift from the pre-scan position to the first specified point and a predetermined shift from the first specified point to the scan start point along the specific direction, a deflection rate is determined according to the coordinates of the first and the second specified points, and an amplification error is determined according to the coordinates of the first and the second specified points, and a predetermined distance between the first and the second specified points.

Preferably, the background region is printed with standard white, and the two color blocks are both printed with standard black.

Preferably, each of the color blocks has a specific geometric shape whose circumference is consisted of sectional lines and/or curves of known mathematical functions, and the first, the second, the third and the fourth reference points are four intersectional points of the circumferences of the first and the second color blocks and the pre-scan position of the photo-signal processing device.

In a preferred embodiment, each of the color blocks is an isosceles and right-angled triangular block, one of the orthogonal sides of which is parallel to the specific direction, and the other orthogonal side of which is located relatively upstream along the specific direction. Therefore, the correlating mathematical function will be $$L1=[(x2-x1)^2+(y2-y1)^2]^{1/2} \cot 45° = [(x2-y1)^2+(y2-y1)^2]^{1/2}$$

in which L1 indicates the shift from the pre-scan position to the specified point along the specific direction, (x1,y1) and (x2,y2) are the coordinates of the first and the second reference points, respectively, and $[(x2-x1)^2+(y2-y1)^2]^{1/2}$ indicates a detected length between the two reference points. Therefore, the photo-signal processing device starts to perform a scanning operation after traveling a distance of (L1+L2) from the pre-scan position along the specific direction, in which L2 is the predetermined shift from the specified point to the scan start point along the specific direction.

The deflection rate m for a scanning result is calculated by an equation of $$m=(y6-y5)/(x6-x5)$$

in which (x5,y5) and (x6,y6) are the coordinates of the first and the second specified points, respectively.

The amplification error ρ for a scanning result is calculated by an equation of $$\rho=1-[(x6-x5)^2+(y6-y5)^2]^{1/2}/L3$$

in which (x5,y5) and (x6,y6) are the coordinates of the first and the second specified points, respectively, and $[(x6-x5)^2+(y6-y5)^2]^{1/2}$ and L3 indicates a detected length and a predetermined distance between the first and the second specified points, respectively.

Generally, the photo-signal processing device includes an image pickup device for performing the scanning operation, and detecting the coordinates of the first and the second reference points; and a driving device for moving the image pickup device from the home position along the specific direction.

In an embodiment, the background region and the color block are both located between the home position and the scan start point. Alternately and preferably, the background region and the color block are both located at the home position of the photo-signal processing device. In this case, the home position will serve as the pre-scan position to perform the pre-scan operation thereat, and the movement of the photo-signal processing device from the home position to the pre-scan position can be omitted.

According to a second aspect of the present invention, an image scanner includes a photo-signal processing device moving along a specific direction from a home position for picking up an image of a scanned document, and converting the image into digital data to be further processed; and a scanning platform for placing thereon the document. The scanning platform has thereon a first color block of a first color, a second color block of a second color, and a background region of a third color different from both of the first and the second colors. The first and the second color blocks are separated from each other, both located within the background region at the home position, and respectively have a first and a second interfaces with the background region. Coordinates of a first reference point and a second reference point located in the first interface, and coordinates of a third reference point and a fourth reference point located in the second interface are read when the photo-signal processing device performs a pre-scan operation at the home position. The coordinates of the first and the second reference points correlate with a shift from the home position to a first specified point of the first color block along the specific direction through a first correlating mathematical function, the coordinates of the first and the second reference points correlate with a coordinate of the first specified point through a second correlating mathematical function, and the coordinates of the third and the fourth reference points correlate with a coordinate of a second specified point of the second color block, which corresponds to the first specified point in position, through a third correlating mathematical function. According to the present invention, a scan start point of the photo-signal processing device for picking up the image of the scanned document is determined according to the shift from the home position to the first specified point and a predetermined shift from the first specified point to the scan start point along the specific direction, a deflection rate is determined according to the coordinates of the first and the second specified points, and an amplification error is determined according to the coordinates of the first and the second specified points, and a predetermined distance between the first and the second specified points.

BRIEF DESCRIPTION OF THE DRAWING

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

First Embodiment

Figure 1:
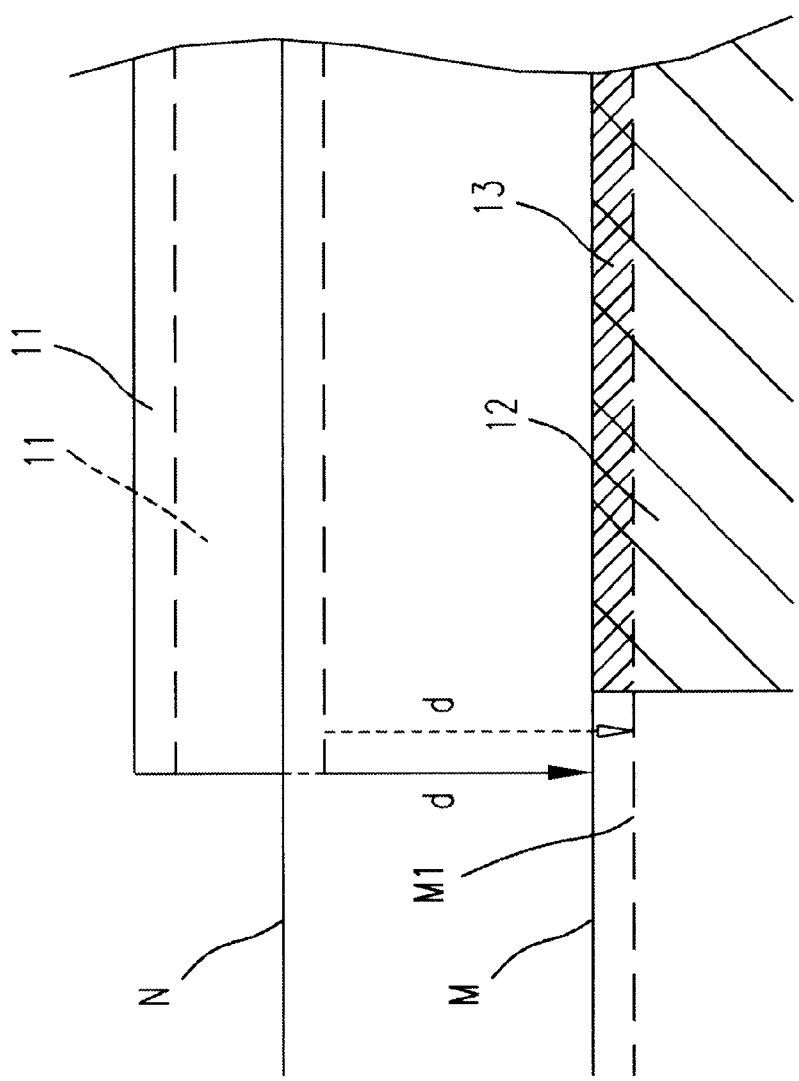
FIG. 1 schematically shows conventional means for locating a scan start of an image scanner, and a possible error is revealed.
Figure 2:
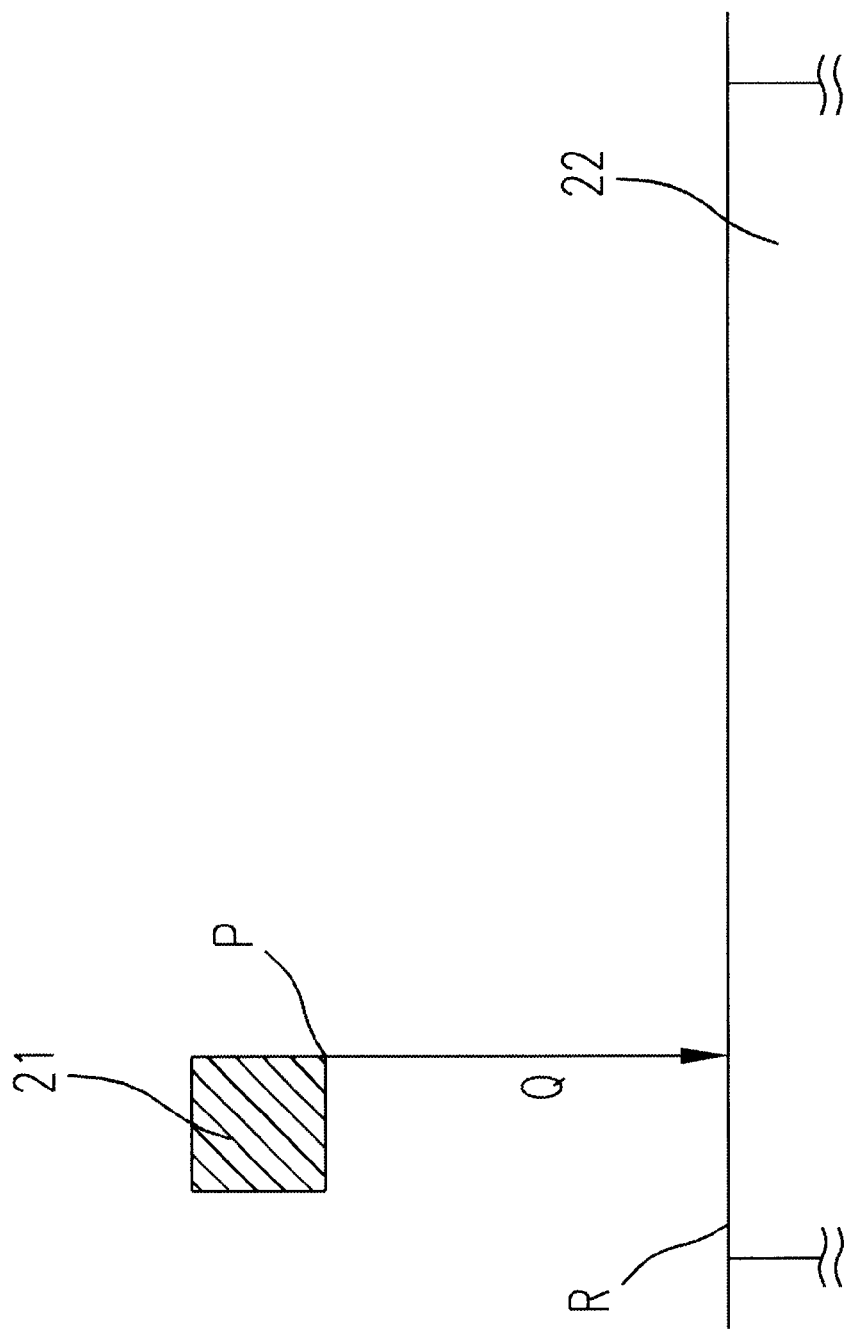
FIG. 2 schematically shows another conventional means for locating a scan start of an image scanner.
Figure 3:
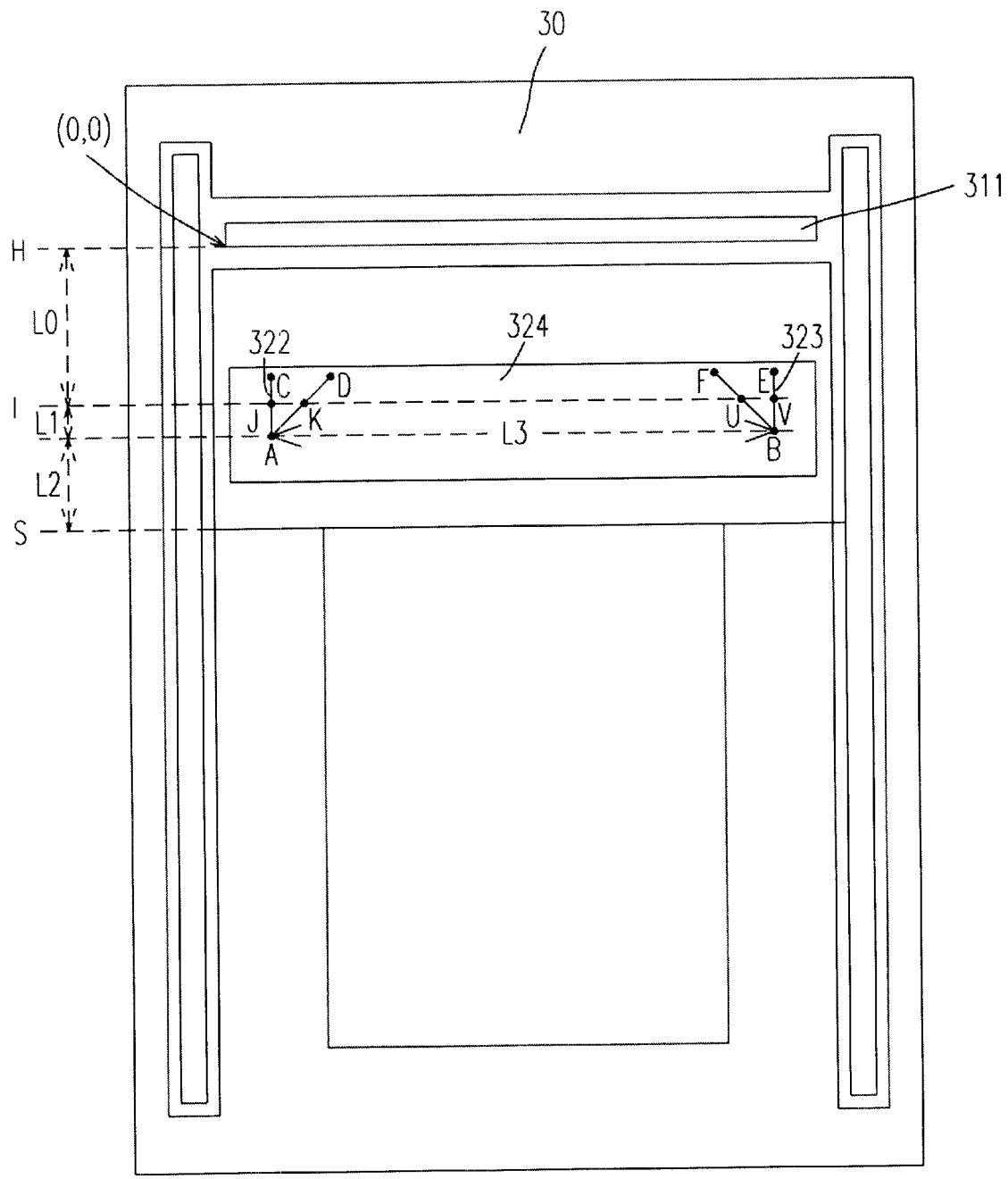
FIG. 3 schematically shows a preferred embodiment of an image scanner according to the invention of the parent application.
Figure 4:
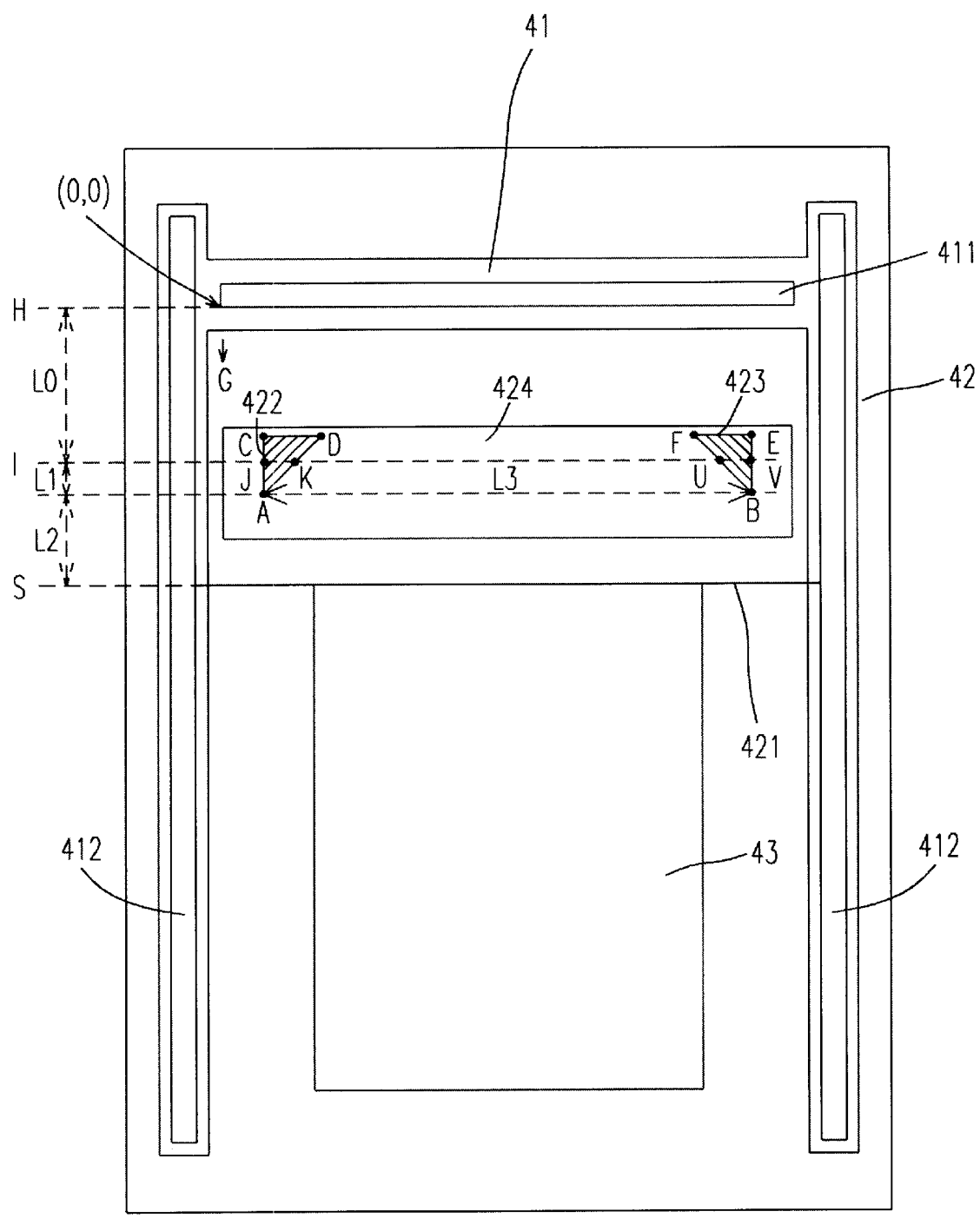
FIG. 4 schematically shows a preferred embodiment of an image scanner according to the present invention.

Please refer to FIG. 4 which is a schematic diagram showing a preferred embodiment of an image scanner according to the present invention from a top view. The image scanner includes a photo-signal processing device 41 and a scanning platform 42. The photo-signal processing device 41 includes an image pickup device 411 and a driving device 412. The image pickup device 411 is for example a CCD having a series of pixel units. The driving device 412 for example includes a motor device, a gear device, and a belt device (not shown), which are well known to those skilled in the art and not to be redundantly described here. The pixel units of the CCD 411 serve as the X-axis of a coordinate, and the movement track of the first pixel unit along the direction of the arrow G serves as the Y-axis of the coordinate. In other words, the coordinate position of the first pixel unit at the original position is (0,0). The scanning platform 42 is marked thereon a document line 421, color blocks 422 and 423, and a background region 424. Each of the color blocks 422 and 423 has a specific geometric shape whose circumference is consisted of sectional lines and/or curves of known mathematical functions so that the coordinate of each of the points constituting the circumference can be calculated.

In the embodiment shown in FIG. 4, the background region 424 and the color blocks 422 and 423 are located between the home position H and the scan start S of the photo-signal processing device 41. The color blocks 422 and 423 are identical and arranged as mirror images of each other. Generally but not necessarily, the background region 424 is of standard white, and the color blocks 422 and 423 are separately printed within the white background region 424 with standard black. The color block 422 is designed to have a shape of an isosceles and right-angled triangle, as shown in FIG. 4, so that it is understood that $\angle CAD=45°$, $\angle ADC=45°$, and $\angle ACD=90°$. The color block 423 thus also have a shape of an isosceles and right-angled triangle, and it is understood that $\angle EBF=45°$, $\angle BFE=45°$ and $\angle BEF=90°$. After a document 43 is properly positioned in a document region behind the document line 421, and a scanning operation is ready to be performed, the driving device 412 transmits the image pickup device 411 to move along the direction represented by the arrow G.

The CCD 411 first rapidly moves a predetermined distance L0 from the home position H to a pre-scan position I overlapping with the color block 422 for example by points J and K and overlapping with the color block 423 for example by points U and V. At this moment, the CCD 411 reads the coordinates of the points J(x1,y1), K(x2,y2), U(x3, y3) and V(x4,y4). Because the points J, K, U and V are four reference points simultaneously read by the CCD 411 at the pre-scan position I, the Y-coordinate values of the four points J, K, U and V will be the same so that the coordinates of the points J, K, U and V can be simplified as J(x1,y1), K(x2,y1), U(x3, y1) and V(x4, y1).

Quick Determination of Scan Start Point

As known to those skilled in the art, the length of the sectional line $\overline{JK}$ is equal to $[(x2-x1)^2+(y2-y1)^2]^{1/2}=(x2-x1)$. On the other hand, owing to the angle 45° between the sectional lines $\overline{CA}$ and $\overline{DA}$, the length of the sectional line $\overline{JA}$ is equal to $(x2-x1)\cot 45°=(x2-x1)$, i.e. the length of the sectional line $\overline{JK}$. Therefore, the CCD 411 will reach the specified point A by moving a distance L1 equal to JA from the pre-scan position I along the direction G. Afterwards, the CCD 411 further moves a distance L2 from the point A to the scan start point to start a scanning operation. The distance L2 is predetermined to make the scanning operation start when or immediately before the CCD 411 reaches the document line 421. In this embodiment, the document line 421 is used as the scan start S and the distance L2 is set to be the distance between the point A and the document line 421. Conclusively, the CCD 411 moves an overall distance of (L0+L1+L2) from the home position H to the scan start S. The movement is quick because the distances L0 and L2 are predetermined, and the distance L1 is calculated according to the coordinates of the points J(x1,y1) and K(x2,y1) read at the pre-scan position I, and the geometrical correlation among the points J, K and A.

Calculation of Deflection Rate

The deflection rate m can be calculated by an equation of $$m=(y6-y5)/(x6-x5),$$

in which (x5, y5) and (x6, y6) are the coordinates of the two specified points A and B which are ultimate points of the two triangular blocks 322 and 323, respective, in this embodiment. The detected lengths of the sectional lines $\overline{JK}$ and $\overline{UV}$ are equal to (x2−x1) and (x4−x3), respectively, so that the calculated lengths of he sectional lines $\overline{JA}$ and $\overline{VB}$ are equal to (x2−x1) and (x4−x3), respectively. Therefore, the coordinates of the two specified points A(x5,y5) and B(x6,y6) can be estimated by the following equations:

$$x5=x1$$
$$y5=y1+(x2-x1)$$
$$x6=x4$$
$$y6=y1+(x4-x3)$$

in which x1, x2, x3, x4 and y1 are defined as above, and are determined during the pre-scan operation. The deflection rate can be used to correct the scanning result so as to obtain a better scanning quality.

Calculation of Amplification Error

An amplification error ρ can be calculated by an equation of $$\rho=1[-(x6-x5)^2+(y6-y5)^2]^{1/2}/L3$$

in which (x5,y5) and (x6,y6) are defined as above, and $[(x6-x5)^2+(y6-y5)^2]^{1/2}$ and L3 indicates a detected length and a predetermined distance between the two specified points A and B, respectively. For example, for a CCD having a resolution of 600 DPI (dot per inch), the predetermined distance, i.e. the total pixel number between the two points A and B, should be L3=10*600=6000 if the length between the two points is assumed to be 10 inches. In case that the detected pixel number between the two points, i.e. $[(x6-x5)^2+(y6-y5)^2]^{1/2}$, is 5700, the amplification error ρ will be 1−5700/6000=0.05. The amplification error can also be used to correct the scanning result so as to obtain a better scanning quality.

Second Embodiment

Figure 5:
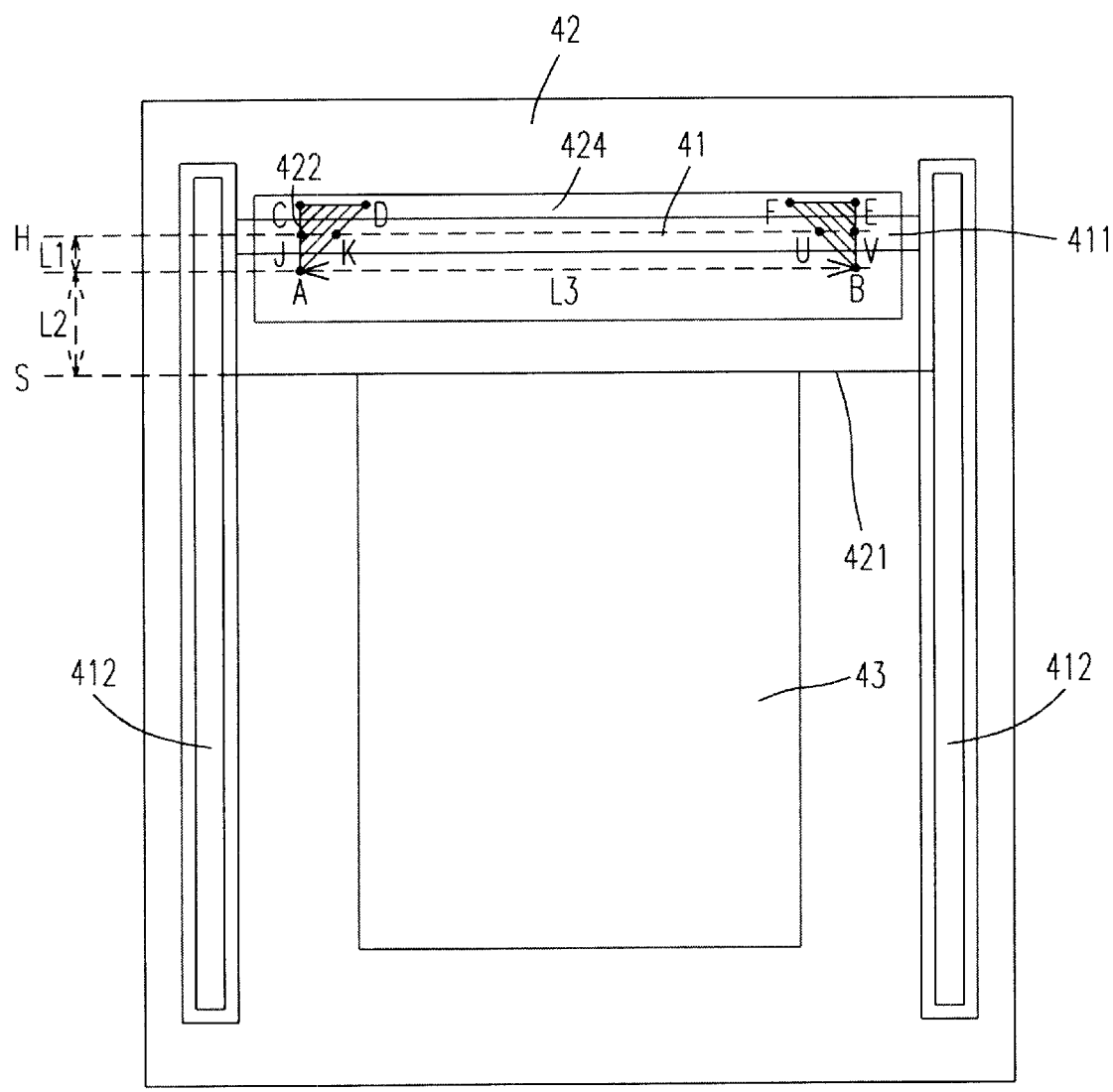
FIG. 5 schematically shows another preferred embodiment of an image scanner according to the present invention.
Figure 6A:
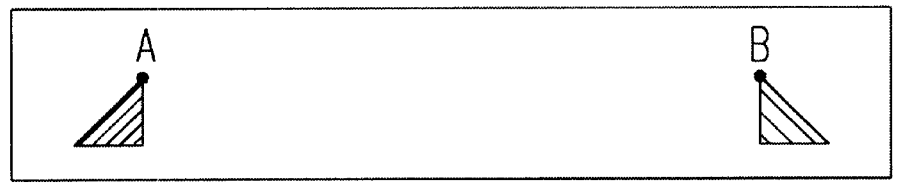
FIGS. 6A–6G illustrate alternative examples of color blocks according to the present invention.
Figure 6B:
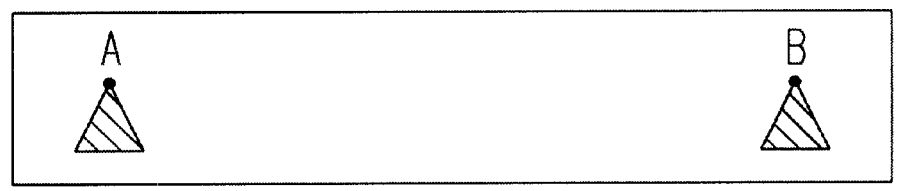
Figure 6C:
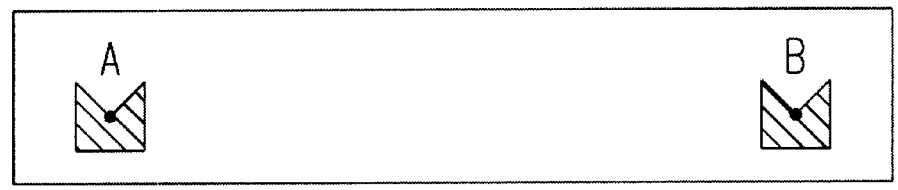
Figure 6D:
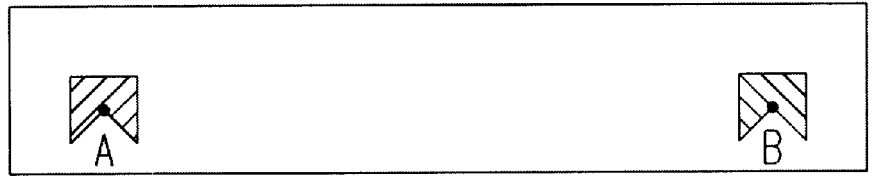
Figure 6E:
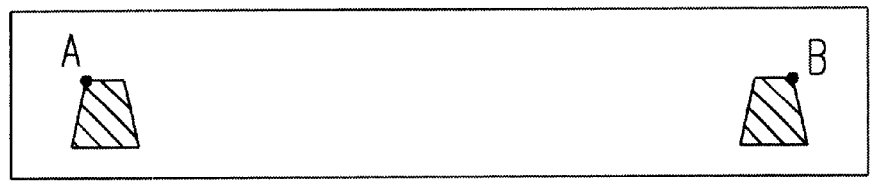
Figure 6F:
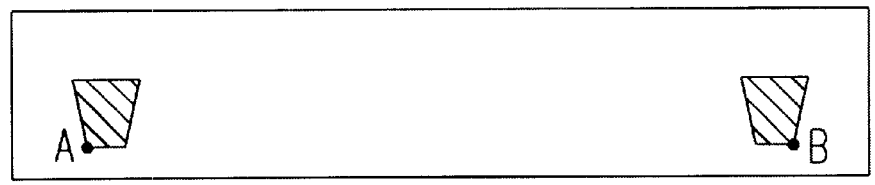
Figure 6G:
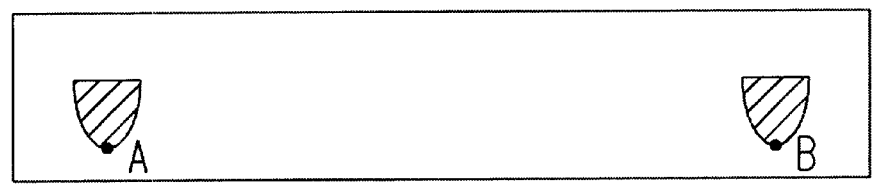

Please refer to FIG. 5 which schematically shows another preferred embodiment of an image scanner according to the present invention. This embodiment is similar to the image scanner of FIG. 4 except that the background region 424 and the color blocks 422 and 423 are located at the home position H of the photo-signal processing device 411. The operational principles for determining the scan start point and calculating the deflection rate and the amplification error are also similar to the embodiment of FIG. 4, so it would not be redundantly described here. In this embodiment, the home position H serves as the pre-scan position I of FIG. 4 so that the coordinates of the reference points J and K are realized at the home position H. In other words, the movement of the distance L0 from the home position H to the pre-scan position I can be omitted so that the three-stage movement operations, i.e. L0+L1+L2, can be reduced as a two-stage movement operation, i.e. L1+L2. Accordingly, the scanning speed can be enhanced. By the way, owing to the omission of the distance L0, the length of the platform can be reduced.

It should be noted that the provision of the color blocks according to the present invention prevents from the adverse effect resulting from the contamination spots for the following reason.

According to the present invention, the reference points used for automatically adjusting the distance L1 are located in the interfaces between the background region and the respective color blocks. The two color blocks are separated, and the background region is of a color different from that of each of the color blocks. Accordingly, colors are different on both sides of each of the interfaces, so the coordinates of the four reference points may be detected according to color changes therearound rather than single points detected at the pre-scan position or home position as taught in the parent application. Therefore, the contamination spots which are likely to be considered as the reference points in the parent application will not be read in the present invention because there is not color change therearound.

To sum up, owing to the provision of the color blocks according to the present invention, the overall scanning speed can be improved because the CCD can directly move the distances L0, L1 and L2 quickly without improperly starting the image pickup operation. Furthermore, the means for quickly and precisely determining the scan start point according to the present invention will not suffer from contamination spots because the determination of the four reference points are performed according to color changes therearound. Moreover, if the color blocks are located at the home position which serves as the pre-scan position, the movement of the distance L0 can be omitted so that the length of the platform can be reduced and the scanning speed can be enhanced.

Several alternative examples of color blocks according to the present invention are illustrated in FIGS. 6A~6G, respectively. Each of the color block has a specific geometric shape whose circumference is consisted of sectional lines and/or curves of known mathematical functions so that the coordinate of each of the points constituting the circumference of the color block can be calculated to further realize the distance L1. The points A and B specified in each of the FIGS. 6A~6G serves as the first and the second specified points of the first and the second color blocks of the present invention. The determination method by using any of these alternative examples is quite similar to the aforementioned example, and is not to be redundantly described here.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image scanner, comprising:

a photo-signal processing device moving along a specific direction from a home position for picking up an image of a scanned document, and converting said image into digital data to be further processed; and a scanning platform for placing thereon said document, having thereon:

a first color block located in front of said scan start point along said specific direction, and being of a first color;

a second color block located in front of said scan start point along said specific direction, separated from said first color block, and being of a second color; and a background region enclosing said first and said second color blocks, having a first and a second interfaces with said first and said second color blocks, respectively, and being of a third color different from both of said first and said second colors;

wherein coordinates of a first reference point and a second reference point located in said first interface, and coordinates of a third reference point and a fourth reference point located in said second interface are read when said photo-signal processing device moves to a pre-scan position and performs a pre-scan operation; said coordinates of said first and said second reference points correlate with a shift from said pre-scan position to a first specified point of said first color block along said specific direction through a first correlating mathematical function; said coordinates of said first and said second reference points correlate with a coordinate of said first specified point through a second correlating mathematical function; said coordinates of said third and said fourth reference points correlate with a coordinate of a second specified point of said second color block, which corresponds to said first specified point in position, through a third correlating mathematical function; a scan start point of said photo-signal processing device for picking up said image of said scanned document is determined according to said shift from said pre-scan position to said first specified point, and a predetermined shift from said first specified point to said scan start point along said specific direction; a deflection rate is determined according to said coordinates of said first and said second specified points; and an amplification error is determined according to said coordinates of said first and said second specified points, and a predetermined distance between said first and said second specified points.

2. The image scanner according to claim 1 wherein said photo-signal processing device includes:

an image pickup device for performing said scanning operation, and detecting said coordinates of said first, said second, said third and said fourth reference points; and a driving device for moving said image pickup device from said home position along said specific direction.

3. The image scanner according to claim 1 wherein said background region is located at said home position of said photo-signal processing device.

4. The image scanner according to claim 1 wherein said first and said second colors are both standard black, and said third color is standard white.

5. The image scanner according to claim 1 wherein each of said first and said second color blocks has a specific geometric shape whose circumference is consisted of sectional lines and/or curves of known mathematical functions, and said first, said second, said third and said fourth reference points are four intersectional points of said circumferences of said first and said second color blocks and said pre-scan position of said photo-signal processing device.

6. The image scanner according to claim 5 wherein said first and said second color blocks are both triangular blocks, and arranged as mirror images of each other.

7. The image scanner according to claim 6 wherein each of said triangular blocks is of an isosceles and right-angled triangle.

8. The image scanner according to claim 7 wherein one of the orthogonal sides of said isosceles and right-angled triangle is parallel to said specific direction, and the other orthogonal side is located relatively upstream along said specific direction.

9. The image scanner according to claim 8 wherein said first correlating mathematical function for correlating said coordinates (x1,y1) and (x2,y2) of said first and said second reference points with said shift L1 from said pre-scan position to said specified point is given by $$L1=[(x2-x1)^2+(y2-y1)^2]^{1/2}\cot\theta=[(x2-x1)^2+(y2-y1)^2]^{1/2}$$

in which $[(x2-x1)^2+(y2-y1)^2]^{1/2}$ indicates a detected length between said first and said second reference points, and $\theta$ is 45°.

10. The image scanner according to claim 9 wherein said photo-signal processing device starts to perform a scanning operation after traveling a distance of (L1+L2) from said pre-scan position along said specific direction, in which L2 is said predetermined shift from said specified point to said scan start point along said specific direction.

11. The image scanner according to claim 8 wherein said first and said second specified points are ultimate points of said first and said second color blocks, respectively.

12. The image scanner according to claim 11 wherein a deflection rate m for a scanning result is calculated by an equation of $$m=(y6-y5)/(x6-x5)$$

in which (x5,y5) and (x6,y6) are said coordinates of said first and said second specified points, respectively.

13. The image scanner according to claim 11 wherein said amplification error ρ for a scanning result is calculated by an equation of $$\rho=1-[(x6-x5)^2+(y6-y5)^2]^{1/2}/L3$$

in which (x5,y5) and (x6,y6) are said coordinates of said first and said second specified points, respectively, and $[(x6-x5)^2+(y6-y5)^2]^{1/2}$ and L3 indicates a detected length and a predetermined distance between said first and said second specified points, respectively.

14. An image scanner, comprising:

a photo-signal processing device moving along a specific direction from a home position for picking up an image of a scanned document, and converting said image into digital data to be further processed; and a scanning platform for placing thereon said document, having thereon:

a first color block located at said home position, and being of a first color;

a second color block located at said home position, separated from said first color block, and being of a second color; and a background region enclosing said first and said second color blocks, having a first and a second interfaces with said first and said second color blocks, respectively, and being of a third color different from both of said first and said second colors;

wherein said photo-signal processing device performs a pre-scan operation to read coordinates of a first reference point and a second reference point located in said first interface, and coordinates of a third reference point and a fourth reference point located in said second interface at said home position; said coordinates of said first and said second reference points correlate with a shift from said home position to a first specified point of said first color block along said specific direction through a first correlating mathematical function; said coordinates of said first and said second reference points correlate with a coordinate of said first specified point through a second correlating mathematical function; said coordinates of said third and said fourth reference points correlate with a coordinate of a second specified point of said second color block, which corresponds to said first specified point in position, through a third correlating mathematical function; a scan start point of said photo-signal processing device for picking up said image of said scanned document is determined according to said shift from said home position to said first specified point, and a predetermined shift from said first specified point to said scan start point along said specific direction; a deflection rate is determined according to said coordinates of said first and said second specified points; and an amplification error is determined according to said coordinates of said first and said second specified points, and a predetermined distance between said first and said second specified points.

15. The image scanner according to claim 14 wherein said photo-signal processing device includes:

an image pickup device for performing said scanning operation, and detecting said coordinates of said first, said second, said third and said fourth reference points; and a driving device for moving said image pickup device from said home position along said specific direction.

16. The image scanner according to claim 15 wherein said first and said second colors are both standard black, and said third color is standard white.

17. The image scanner according to claim 15 wherein each of said first and said second color blocks has a specific geometric shape whose circumference is consisted of sectional lines and/or curves of known mathematical functions, and said first, said second, said third and said fourth reference points are four points of said circumferences of said first and said second color blocks read at said home position of said photo-signal processing device.

18. The image scanner according to claim 17 wherein said first and said second color blocks are both triangular blocks, and arranged as mirror images of each other.

19. The image scanner according to claim 18 wherein each of said triangular blocks is of an isosceles and right-angled triangle.

20. The image scanner according to claim 19 wherein one of the orthogonal sides of said isosceles and right-angled triangle is parallel to said specific direction, and the other orthogonal side is located relatively upstream along said specific direction.

21. The image scanner according to claim 20 wherein said first correlating mathematical function for correlating said coordinates (x1,y1) and (x2,y2) of said first and said second reference points with said shift L1 from said home position to said specified point is given by $$L=1[(x2-x1)^2+(y2-y1)^2]^{1/2}\cot\theta=[(x2-x1)^2+(y2=y1)^2]^{1/2}$$

in which $[(x2-x1)^2+(y2-y1)^2]^{1/2}$ indicates a detected length between said first and said second reference points, and θ is 45°.

22. The image scanner according to claim 21 wherein said photo-signal processing device starts to perform a scanning operation after traveling a distance of (L1+L2) from said home position along said specific direction, in which L2 is said predetermined shift from said specified point to said scan start point along said specific direction.

23. The image scanner according to claim 20 wherein said first and said second specified points are ultimate points of said first and said second color blocks, respectively.

24. The image scanner according to claim 23 wherein a deflection rate m for a scanning result is calculated by an equation of $$m=(y6-y5)/(x6-x5)$$

in which (x5,y5) and (x6,y6) are said coordinates of said first and said second specified points, respectively.

25. The image scanner according to claim 23 wherein said amplification error ρ for a scanning result is calculated by an equation of $$\rho=1-[(x6-x5)^2+(y6-y5)^2]^{1/2}/L3$$

in which (x5,y5) and (x6,y6) are said coordinates of said first and said second specified points, respectively, and $[(x6-x5)^2+(y6-y5)^2]^{1/2}$ and L3 indicates a detected length and a predetermined distance between said first and said second specified points, respectively.

* * * * *